(12) United States Patent
Orlin

(10) Patent No.: US 7,280,627 B2
(45) Date of Patent: Oct. 9, 2007

(54) CONSTRAINED DATA-ADAPTIVE SIGNAL REJECTOR

(75) Inventor: David J. Orlin, Westminster, MD (US)

(73) Assignee: The Johns Hopkins University, Baltimore, MD (US)

( * ) Notice: Subject to any disclaimer, the term of this patent is extended or adjusted under 35 U.S.C. 154(b) by 679 days.

(21) Appl. No.: 10/730,571

(22) Filed: Dec. 8, 2003

(65) Prior Publication Data

US 2004/0120429 A1 Jun. 24, 2004

Related U.S. Application Data

(60) Provisional application No. 60/431,845, filed on Dec. 9, 2002.

(51) Int. Cl.
*H04L 1/02* (2006.01)
(52) U.S. Cl. .................................... 375/347
(58) Field of Classification Search ............. 375/346, 375/347; 455/132, 296
See application file for complete search history.

(56) References Cited

U.S. PATENT DOCUMENTS

| | | | |
|---|---|---|---|
| 3,763,490 A | 10/1973 | Hadley et al. | |
| 4,536,887 A | 8/1985 | Kaneda et al. | |
| 4,672,378 A | * | 6/1987 | Drabowitch et al. .......... 342/17 |
| 4,802,227 A | 1/1989 | Elko et al. | |
| 4,956,867 A | 9/1990 | Zurek et al. | |
| 5,349,567 A | 9/1994 | Reed | |
| 5,473,701 A | 12/1995 | Cezanne et al. | |
| 5,475,761 A | 12/1995 | Eatwell | |
| 5,581,495 A | 12/1996 | Adkins et al. | |
| 5,627,799 A | 5/1997 | Hoshuyama | |
| 5,825,898 A | 10/1998 | Marash | |
| 6,058,075 A | 5/2000 | Bourdelais | |
| 6,252,540 B1 | 6/2001 | Hale et al. | |
| 6,408,978 B1 | 6/2002 | Premus | |
| 6,449,586 B1 | 9/2002 | Hoshuyama | |
| 2002/0152253 A1 | 10/2002 | Ricks et al. | |
| 2002/0198914 A1 | 12/2002 | Picciolo et al. | |
| 2003/0065262 A1 | 4/2003 | Stergiopoulos et al. | |

FOREIGN PATENT DOCUMENTS

JP 11308130 A * 11/1999

* cited by examiner

*Primary Examiner*—David C. Payne
*Assistant Examiner*—Leon Flores
(74) *Attorney, Agent, or Firm*—Albert J. Fasulo, II

(57) ABSTRACT

A constrained data-adaptive signal rejector suppresses signals received through the side lobes of a sensor array while preserving signals received through the main lobes. A main beam is formed in a typical signal processing architecture. A subset of the original independent sensor signals are paired into auxiliary channels using a weighting scheme that results in a beam pattern having a null in the direction of the beam mainlobe. The auxiliary channels are then used in a traditional multiple sidelobe cancellation architecture to reject unwanted signals.

15 Claims, 2 Drawing Sheets

US 7,280,627 B2

CONSTRAINED DATA-ADAPTIVE SIGNAL REJECTOR

CROSS REFERENCE TO RELATED APPLICATIONS

This application is related to and claims the benefit of U.S. Provisional Patent Application Ser. No. 60/431,845, filed Dec. 9, 2002 entitled "Constrained Data—Adaptive Signal Rejector."

BACKGROUND

Signals detected in the mainlobe of an array pattern tend to be strong signals in a combined beamformer output. Data-adaptive cancellation systems minimize the difference between the beamformer output and a reference signal, usually comprised of only white noise. Thus, without a mainlobe constraint, the adaptive process may minimize the beamformer output by rejecting mainlobe signals. Delta channel auxiliary signals effectively remove mainlobe signals from consideration with respect to operation of the data-adaptive process. This allows the system to detect and reject only unwanted sidelobe signals.

The general approach to adaptive cancellation of sidelobe signals is to incorporate independent auxiliary sensors in an array design. The response pattern for individual sensors tends to be approximately uniform, so signals collected by the sensors from all directions receive approximately equal gain. Commonly, without the benefit of array gain from a beamformer, the signals of interest, mainlobe signals, are weaker than interfering signals, so the interfering signals appear stronger in the auxiliary sensor outputs. Thus, an adaptive process using these auxiliary sensors will tend to suppress the interfering signals. However, if the signal of interest is stronger than the interferers, the adaptive process will tend to suppress the signal of interest instead. Furthermore, it is often not desirable, practical, or possible to add additional sensor elements to an array.

SUMMARY

The constrained data-adaptive signal rejector of the present invention suppresses signals received through the side lobes of a sensor array while preserving signals received through the main lobes. The processes of the present invention occur after the main beam is formed in a typical signal processing architecture. The present invention utilizes a subset of the original independent sensor signals as well as the signal from the beamformer output (main beam).

Selected signals from individual sensors are paired combined using a weighting scheme that results in a beam pattern having a null in the direction of the beam mainlobe. The sensor pair combinations are termed auxiliary channels. The auxiliary channels are then used in a traditional multiple sidelobe cancellation architecture to reject unwanted signals. A signal covariance matrix is formed by sampling data from the auxiliary channels. A cross-covariance matrix is formed by sampling data from the auxiliary channels and the main channel. A set of weights is calculated and applied to the auxiliary channels to minimize the system output when compared with a white noise reference signal. The weighted auxiliary channels are then subtracted from the main channel. The resulting main channel contains the desired main lobe signals without the undesired side lobe signals.

DETAILED DESCRIPTION

The constrained data-adaptive signal rejector of the present invention combines pairs of sensors using a "delta pattern" weighting that produces an auxiliary channel signal that is orthogonal to the target signal in the main channel. The adaptive process looks for similarity between the main channel and the auxiliary channels but is unable to detect the target signal and does not affect it.

Figure 1:
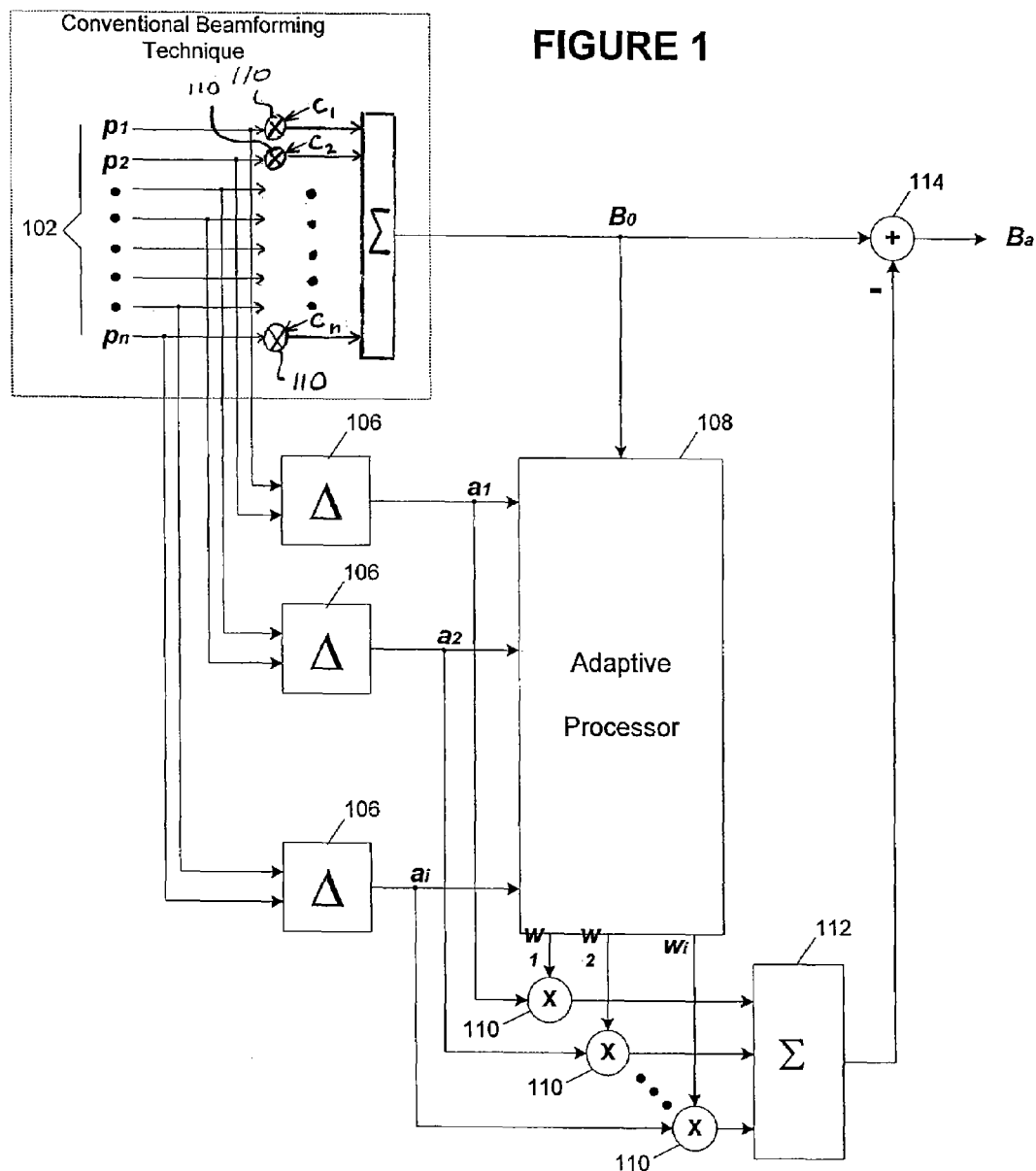
FIG. 1 is a block diagram illustrating various components that comprise the present invention.

FIG. 1 is a block diagram illustrating various components that comprise the present invention. A plurality of sampled sensor signals ($p_1$-$p_n$) 102 are received into the system. The sampled sensor signals 102, also known as elemental data, represent acoustic or electro-magnetic output of receiving elements of a sensor array. The sampled sensor signals 102 are summed or combined via summing circuitry 104 to form a main beam signal ($B_0$) or target signal using conventional techniques. A small subset of the sampled sensor signals 102 are paired together and fed to a plurality of 'delta' functions 106 that form delta beams ($a_1$-$a_i$) that have a 'zero' response along the maximum response axis of the main target beam. These are termed delta channel auxiliary signals.

The samples from the main beam ($B_0$) and the delta channel auxiliary signals ($a_1$-$a_i$) are supplied to an adaptive processor 108. The adaptive processor 108 computes a covariance matrix using only the delta channel auxiliary signals ($a_1$-$a_i$). The adaptive processor 108 also computes cross-covariance vector using both the main beam ($B_0$) and the delta channel auxiliary signals ($a_1$-$a_i$). A vector of delta channel auxiliary signal weight factors is also calculated. Each sample from the delta channel auxiliary signals is fed to a multiplier 110 and multiplied by its corresponding weight factor resulting in a plurality of weighted delta channel auxiliary signals. The plurality of weighted delta channel auxiliary signals are supplied to another summing circuit 112 yielding a target-free suppressor channel. The target-free suppressor channel samples are then fed to a differencing circuit 114 where they are subtracted from the main beam ($B_0$) resulting in an interference-free main beam (Ba).

Figure 2:
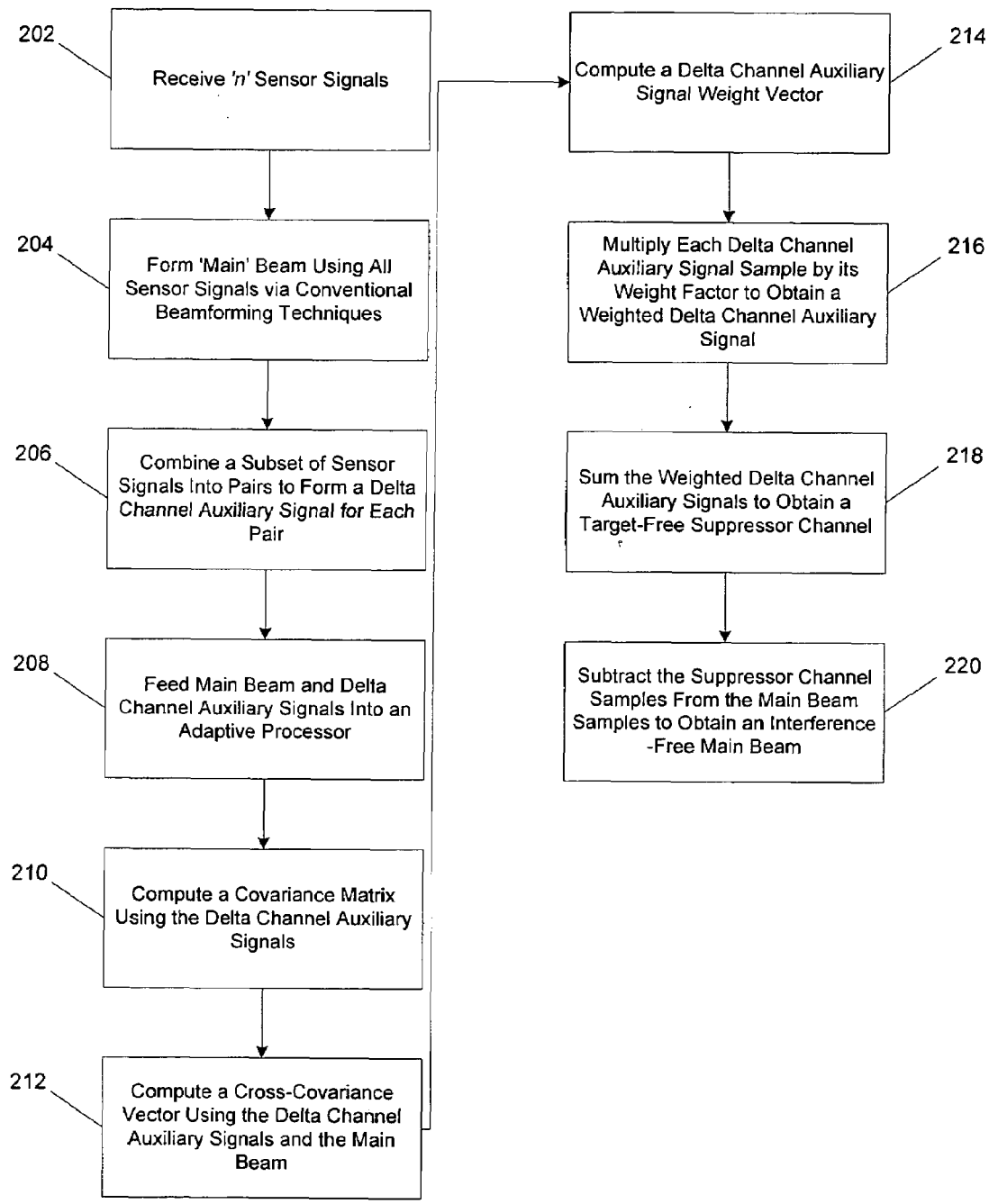
FIG. 2 is a flowchart describing the processes of the present invention.

FIG. 2 is a flowchart describing the processes of the present invention in greater detail. The system is set up to receive a plurality of 'n' sensor signals 202. The sensor signals are typically arranged in an array pattern to maximize the coverage of the system. The signals yield elemental data that represents the acoustic or electromagnetic output of the receiving elements of the sensor array. All of the sensor signals (e.g., signals 102, $P_1$-$P_n$, in FIG. 1) are used to form a main beam (e.g., $B_0$ in FIG. 1) 204 using conventional beamforming techniques well known in the art. An optional element-by-element weighting (e.g., using weights $c_1$-$c_n$, in FIG. 1) can be applied (e.g., via respective mulitplier 110) to each elemental data signal (e.g., $p_1$-$p_n$, respectively) to adjust the maximum response axis of the array of sensors and to reduce array sidelobe levels.

In addition, a subset of the elemental data signals are also combined in pairs 206. The selected elements are physically located near the edges of the array, and each pair of signals is chosen from physically neighboring elements. A complex weighting factor is calculated for each signal in a pair such that the maximum response axis of the resulting combination is aligned with the maximum response axis of the main beam. The complex weight is assigned opposite amplitudes (+/−) for each signal in the pair. This produces a "delta" beam having zero response along the maximum response axis. This is called a delta-channel auxiliary signal. The samples from the main beam and the delta-channel auxiliary signals are then supplied to an adaptive processor 208.

The adaptive processor computes a covariance matrix using the delta-channel auxiliary signals 210. Each member of the matrix is the estimate of the covariance between two auxiliary signals, with the whole matrix containing estimates for every possible delta-channel auxiliary signal combination. The main diagonal contains the variance of the corresponding delta-channel auxiliary signal. This matrix is called M. If the delta-channel auxiliary signal samples are arranged along columns in a matrix called A, then M is calculated by, $$M = \frac{1}{N}(A \cdot A^H).$$

N is the number of samples supplied to the adaptive processor. The superscript H denotes combined conjugation and transposition.

The adaptive processor also computes a cross-covariance vector using the delta-channel auxiliary signals and the main beam 212. Each member of the vector is the estimate of the covariance between a delta-channel auxiliary signal and the main beam. This vector is called $\Lambda$. If the samples from the main beam are arranged in a column vector called $B_0$, then $\Lambda$ is calculated by, $$\Lambda = \frac{1}{N}(A \cdot B_0^H).$$

The adaptive processor then computes a vector of delta-channel auxiliary signal weights 214 according to, $$w = (M^{-1}\Lambda)^*,$$

where the (*) symbol denotes conjugation.

Each sample from the delta-channel auxiliary signal is then multiplied by its corresponding weight 216. The result is a weighted delta-channel auxiliary signal. The weighted delta-channel auxiliary signals are summed 218. The result is a target-free suppressor channel. The suppressor channel samples are subtracted from the main beam samples 220. The result is an interference-free main beam.

In an active sonar application intended to reject sidelobe reverberation signals, the covariance matrices are calculated using a window of data in which the middle half corresponds to the data to be adaptively processed. That is, the system is implemented with a 50% overlap to allow for the non-stationary nature of the reverberation signals. If the window of data is of length 2N, the covariance and cross-covariance is calculated using all 2N data samples. The adaptive process is performed over all 2N data samples. Only the middle N samples, however, are output. The first N samples are then removed and N new samples are appended to the working data buffer and the process repeats.

The present invention has been described, in part, with reference to flowcharts or logic flow diagrams. It will be understood that each block of the flowchart diagrams or logic flow diagrams, and combinations of blocks in the flowchart diagrams or logic flow diagrams, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks or logic flow diagrams.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart blocks or logic flow diagrams. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart blocks or logic flow diagrams.

Accordingly, block(s) of flowchart diagrams and/or logic flow diagrams support combinations of means for performing the specified functions, combinations of steps for performing the specified functions and program instruction means for performing the specified functions. It will also be understood that each block of flowchart diagrams and/or logic flow diagrams, and combinations of blocks in flowchart diagrams and/or logic flow diagrams can be implemented by special purpose hardware-based computer systems that perform the specified functions or steps, or combinations of special purpose hardware and computer instructions.

In the following claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. A method of suppressing side lobe interference in a beamforming process, the method comprising:
    receiving a plurality of sensor signals comprising elemental data;
    forming a main beam comprised of main beam samples using all of the sensor signals, wherein said forming includes applying weights to the main beam samples to reduce sidelobe levels of the main beam;
    combining a small subset of the plurality of sensor signals into signal pairs, wherein the small subset of the plurality of sensor signals that are combined into the signal pairs comprise signals from sensors that are adjacently located near the edges of the array;
    calculating a complex weighting factor for each signal in a pair of the signal pairs such that the maximum response axis of the resulting signal pair combination is aligned with the maximum response axis of the main beam;

assigning opposite amplitudes to each signal in the pair to produce delta-channel auxiliary signals having zero response along the maximum response axis;

computing a covariance matrix, M, using the delta-channel auxiliary signals, wherein each member of the covariance matrix, M, is an estimate of the covariance between two delta-channel auxiliary signals such that the whole matrix contains estimates of every possible delta-channel auxiliary signal combination and the main diagonal of the covariance matrix contains the variance of the corresponding delta-channel auxiliary signal;

computing a cross-covariance vector, Λ, using the delta-channel auxiliary signals and the main beam;

computing a vector of delta-channel auxiliary signal weights;

multiplying each sample from each delta-channel auxiliary signal by its corresponding weight to yield weighted delta-channel auxiliary signals;

summing the weighted delta-channel auxiliary signals to obtain suppressor channel samples; and subtracting the suppressor channel samples from the main beam samples to obtain an interference-free main beam.

2. The method of claim 1 wherein the covariance matrix, M, is calculated according to:

$$M = \frac{1}{N}(A \cdot A^H).$$

where, the delta-channel auxiliary signal samples are arranged along columns in a matrix A;

N is the number of samples; and

H denotes combined conjugation and transposition.

3. The method of claim 2 wherein the samples from the main beam are arranged in a column vector, $B_0$, and the cross-covariance vector, Λ, is calculated according to:

$$\Lambda = \frac{1}{N}(A \cdot B_0^H).$$

4. The method of claim 3 wherein the delta-channel auxiliary signal weights are calculated according to:

w=(M$^{-1}$Λ)* where the (*) symbol denotes conjugation.

5. The method of claim 1 further comprising:

applying an element-by-element weighting to the elemental data to adjust the maximum response axis of the array of sensors and to reduce array sidelobe levels.

6. A system for suppressing side lobe interference in a beamforming process, the system comprising:

means for receiving a plurality of sensor signals comprising elemental data;

means for forming a main beam comprised of main beam samples using all of the sensor signals, wherein said forming includes applying weights to the main beam samples to reduce sidelobe levels of the main beam;

means for combining a small subset of the plurality of sensor signals into signal pairs, wherein the small subset of the plurality of sensor signals that are combined into the signal pairs comprise signals from sensors that are adjacently located near the edges of the array;

means for calculating a complex weighting factor for each signal in a pair of the signal pairs such that the maximum response axis of the resulting signal pair combination is aligned with the maximum response axis of the main beam;

means for assigning opposite amplitudes to each signal in the pair to produce delta-channel auxiliary signals having zero response along the maximum response axis;

means for computing a covariance matrix, M, using the delta-channel auxiliary signals, wherein each member of the covariance matrix, M, is an estimate of the covariance between two delta-channel auxiliary signals such that the whole matrix contains estimates of every possible delta-channel auxiliary signal combination and the main diagonal of the covariance matrix contains the variance of the corresponding delta-channel auxiliary signal;

means for computing a cross-covariance vector, Λ, using the delta-channel auxiliary signals and the main beam;

means for computing a vector of delta-channel auxiliary signal weights;

means for multiplying each sample from each delta-channel auxiliary signal by its corresponding weight to yield weighted delta-channel auxiliary signals;

means for summing the weighted delta-channel auxiliary signals to obtain suppressor channel samples; and means for subtracting the suppressor channel samples from the main beam samples to obtain an interference-free main beam.

7. The system of claim 6 wherein the covariance matrix, M, is calculated according to:

$$M = \frac{1}{N}(A \cdot A^H).$$

where, the delta-channel auxiliary signal samples are arranged along columns in a matrix A;

N is the number of samples; and

H denotes combined conjugation and transposition.

8. The system of claim 7 wherein the samples from the main beam are arranged in a column vector, $B_0$, and the cross-covariance vector, Λ, is calculated according to:

$$\Lambda = \frac{1}{N}(A \cdot B_0^H).$$

9. The system of claim 8 wherein the delta-channel auxiliary signal weights are calculated according to:

w=(M$^{-1}$Λ)* where the (*) symbol denotes conjugation.

10. The system of claim 6 further comprising:

means for applying an element-by-element weighting to the elemental data to adjust the maximum response axis of the array of sensors and to reduce array sidelobe levels.

11. A system for suppressing side lobe interference in a beamforming process comprising:
a processor readable storage medium;
code recorded in the processor readable storage medium to receive a plurality of sensor signals comprising elemental data;
code recorded in the processor readable storage medium to form a main beam comprised of main beam samples using all of the sensor signals, wherein said forming includes applying weights to the main beam samples to reduce sidelobe levels of the main beam;
code recorded in the processor readable storage medium to combine a small subset of the plurality of sensor signals into signal pairs, wherein the small subset of the plurality of sensor signal that are combined into the signal pairs comprise signals from sensors that are adjacently located near the edges of the array;
code recorded in the processor readable storage medium to calculate a complex weighting factor for each signal in a pair of the signal pairs such that the maximum response axis of the resulting signal pair combination is aligned with the maximum response axis of the main beam;
code recorded in the processor readable storage medium to assign opposite amplitudes to each signal in the pair to produce delta-channel auxiliary signals having zero response along the maximum response axis;
code recorded in the processor readable storage medium to compute a covariance matrix, M, using the delta-channel auxiliary signals, wherein each member of the covariance matrix, M, is an estimate of the covariance between two delta-channel auxiliary signals such that the whole matrix contains estimates of every possible delta-channel auxiliary signal combination and the main diagonal of the covariance matrix contains the variance of the corresponding delta-channel auxiliary signal;
code recorded in the processor readable storage medium to compute a cross-covariance vector, $\Lambda$, using the delta-channel auxiliary signals and the main beam;
code recorded in the processor readable storage medium to compute a vector of delta-channel auxiliary signal weights;
code recorded in the processor readable storage medium to multiply each sample from each delta-channel auxiliary signal by its corresponding weight to yield weighted delta-channel auxiliary signals;
code recorded in the processor readable storage medium to sum the weighted delta-channel auxiliary signals to obtain suppressor channel samples; and
code recorded in the processor readable storage medium to subtract the suppressor channel samples from the main beam samples to obtain an interference-free main beam.

12. The system of claim 11 wherein the covariance matrix, M, is calculated according to:

$$M = \frac{1}{N}(A \cdot A^H).$$

where,
the delta-channel auxiliary signal samples are arranged along columns in a matrix A;
N is the number of samples; and
H denotes combined conjugation and transposition.

13. The system of claim 12 wherein the samples from the main beam are arranged in a column vector, $B_0$, and the cross-covariance vector, $\Lambda$, is calculated according to:

$$\Lambda = \frac{1}{N}(A \cdot B_0^H).$$

14. The system of claim 13 wherein the delta-channel auxiliary signal weights are calculated according to:

$$w = (M^{-1}\Lambda)^*$$

where the (*) symbol denotes conjugation.

15. The system of claim 11 further comprising:
applying an element-by-element weighting to the elemental data to adjust the maximum response axis of the array of sensors and to reduce array sidelobe levels.

* * * * *